United States Patent [19]
Windle

[11] Patent Number: 5,839,644
[45] Date of Patent: Nov. 24, 1998

[54] METHOD OF COUPLING AND FORMING COPPER FITTINGS WITH SOLDER THEREIN

[76] Inventor: John W. L. Windle, c/o C & G, 16650 Harbor Blvd., A-1, Fountain Valley, Calif. 92708

[21] Appl. No.: 523,285

[22] Filed: Sep. 5, 1995

Related U.S. Application Data

[62] Division of Ser. No. 224,807, Apr. 8, 1994, abandoned.

[51] Int. Cl.$^6$ .............................. B23K 1/20; B23K 31/02; B21B 17/02
[52] U.S. Cl. ......................... 228/168; 228/169; 228/254; 72/370
[58] Field of Search .................................... 228/254, 168, 228/169; 72/75, 370

[56] References Cited

U.S. PATENT DOCUMENTS

| | | | |
|---|---|---|---|
| 465,957 | 12/1891 | Willmott | 72/370 |
| 568,574 | 9/1896 | Hoyer | 72/75 |
| 2,084,207 | 6/1937 | Lindquist | 285/287 |
| 2,120,067 | 6/1938 | Gray et al. | 285/287 |
| 3,419,953 | 1/1969 | Deimen | 228/168 |

FOREIGN PATENT DOCUMENTS

| | | | |
|---|---|---|---|
| 278962 | 5/1990 | German Dem. Rep. | 72/730 |
| 1473883 | 4/1987 | U.S.S.R. | 72/75 |

*Primary Examiner*—P. Austin Bradley
*Assistant Examiner*—Jeffrey T. Knapp
*Attorney, Agent, or Firm*—James G. O'Neill

[57] ABSTRACT

An improved fluid fitting made from a portion of copper tubing has at least one annular cavity disposed in its inner periphery adjacent to each open end of the fitting. Solder is disposed in and substantially fills the at least one annular without extending beyond the inner periphery of the fitting. The fitting is fabricated by being placed in a die having a hollow with at least one annular depression. A first mandrel is placed into the fitting, with annular cavity forming ball members in substantial alignment with the at least annular depression of the hollow. The ball members are used to form the at least one annular cavity in the inner periphery of the fitting. A second mandrel has an aperture that substantially aligns with the at least one formed annular cavity and molten solder is injected into the at least one annular cavity through the second mandrel, to substantially fill the at least one annular cavity. The second mandrel forms an interference fit with the inner periphery of the fitting to remove any excess solder protruding from the at least one annular cavity into the inner periphery of the fitting as the mandrel is removed from the fitting.

9 Claims, 3 Drawing Sheets

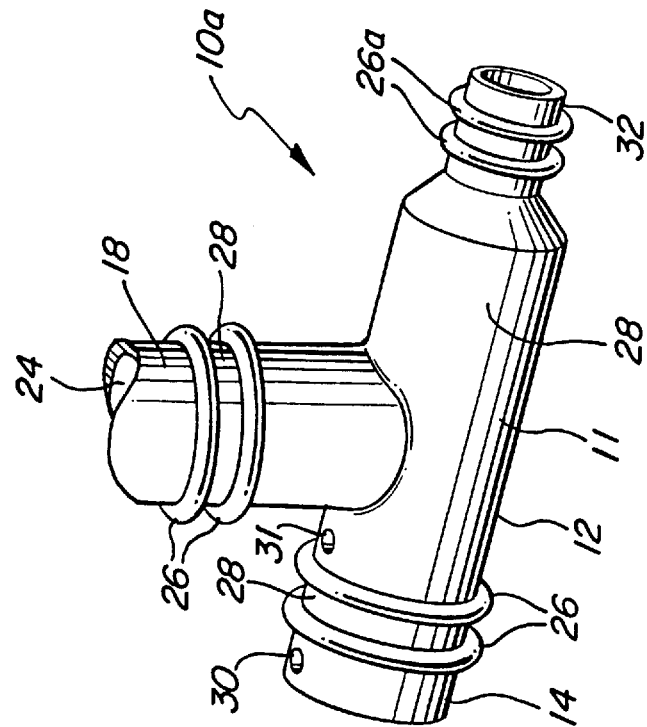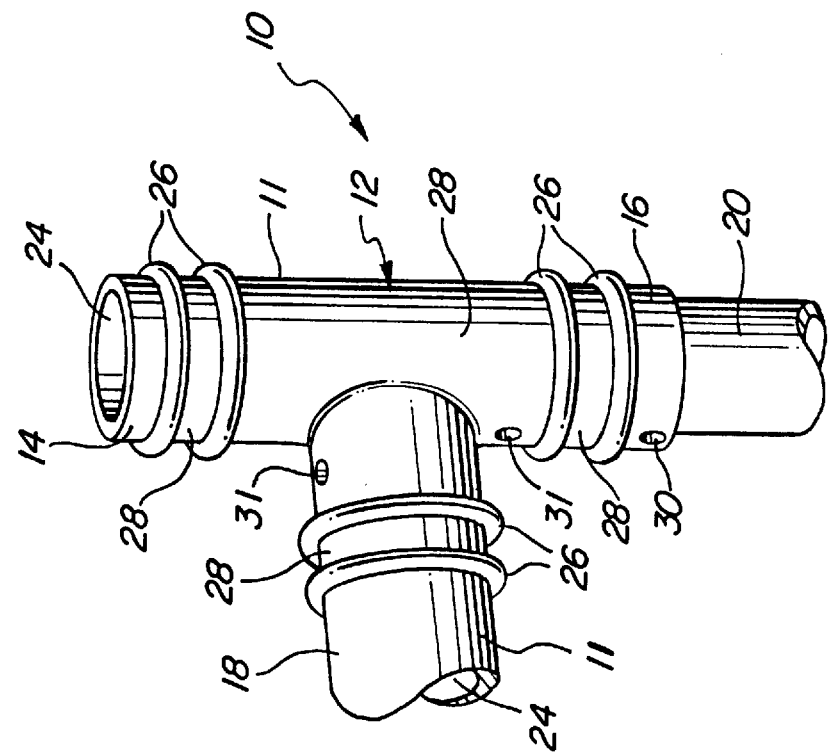

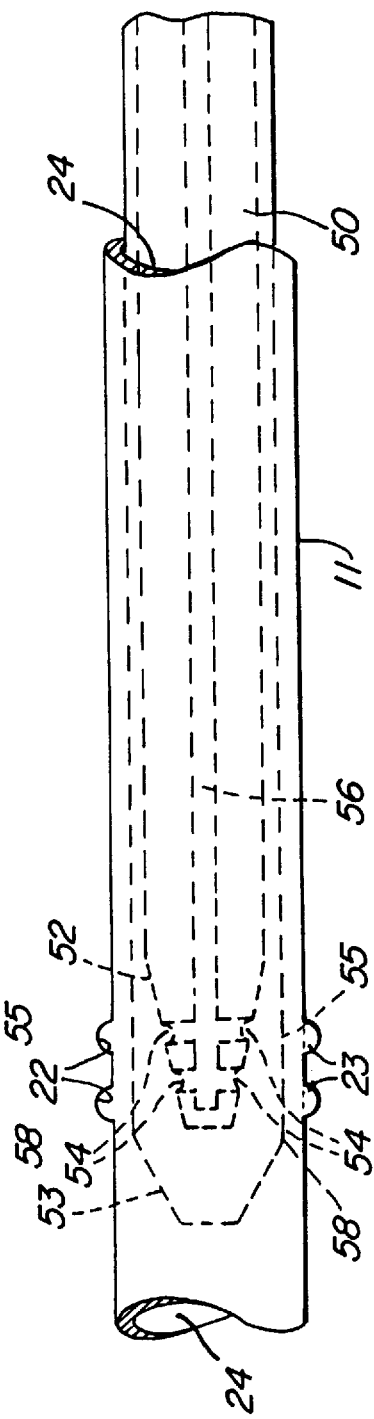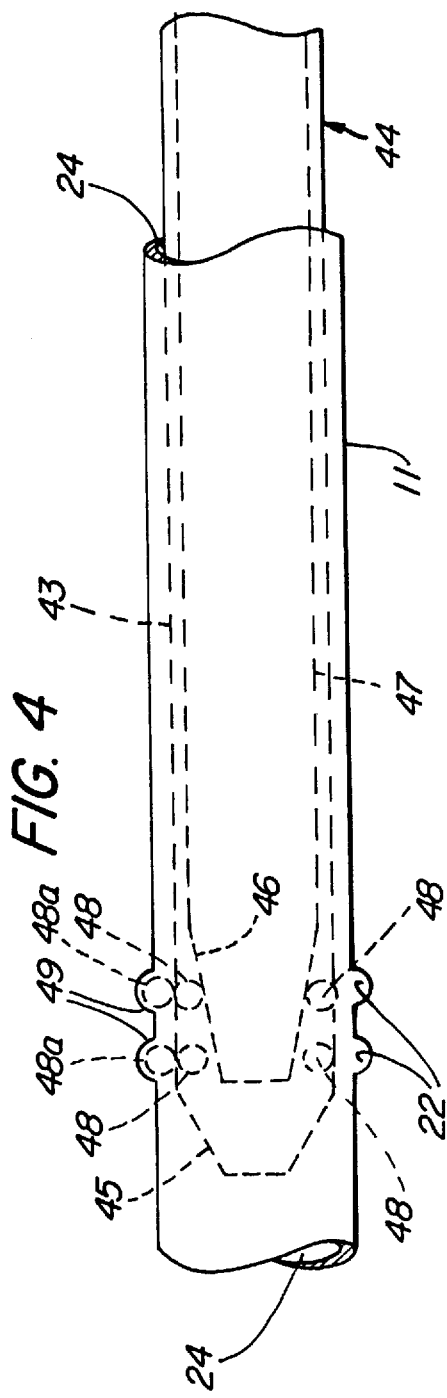

5,839,644

METHOD OF COUPLING AND FORMING COPPER FITTINGS WITH SOLDER THEREIN

This is a division of application Ser. No. 08/224,807, filed on Apr. 8, 1994, now abandoned.

BACKGROUND OF THE INVENTION

1. Field of the Invention

This invention relates generally to devices and methods used for fluid systems, and more particularly, to the provision of improved and simplified plumbing fittings, methods of fabricating such fittings and the construction of fluid systems utilizing such fittings.

2. Description of Related Art

There are a number of different well known pipe types and pipe fittings in use in fluid systems today. For example, in plumbing, pipes and their respective fittings, typically comprised of copper or a plastic, such as polyvinyl chloride, are coupled together utilizing a bonding agent. In, particular, copper pipes and fittings are usually coupled together using well known sweat-fitting techniques.

Copper elements are typically sweat-fit together by first abrading the ends of elements to be coupled, then applying a layer of flux material to the abraded ends. The open ends of the elements are then snug-fit together. The portions of the copper elements snug-fit together are then heated. Molten solder is then applied to the area around where the copper elements are snug-fit together to form to bond such elements together.

A disadvantage of such known copper fittings and methods of bonding occurs when such plumbing fixtures are assembled together in an enclosed environment to form a fluid system using a number of different angled, straight, and T-type fittings. When assembling or installing such systems, it is sometimes difficult to gain sufficient access to the desired pipes and fittings to properly heat and solder the same so as to securely bond the various elements in the system together. This may result because of numerous reasons, such as, a poor application of flux material, or inadequately heating of the portions to be bonded. Whatever the reason, inadequate bonding of the desired pipes and fittings may occur, thus not providing the desired fluid tight system.

A further disadvantage of this known bonding method, is that it is difficult to control the heat applied and thus the flow of molten solder. Therefore, solder may not be evenly dispersed between the pipe and fitting, resulting in spaces or voids between the snug-fit elements, which could result in leakage, or other similar problems.

A still further disadvantage of conventional sweat-fitting, of copper pipes and fittings is that when solder is molten, it tends to cool quickly and/or run or drip off the joint of the pipe or fitting to which it is being applied. This cooling and/or run off may result in an insufficient amount of solder flowing into the space between the snug-fit elements, thus causing an insecure bond. This insecure bond can in turn cause a substantially weak coupling of the elements, which could leak or become separated if too much pressure is applied thereto.

There is, therefore, a need for metallic fittings that provide simplified means for coupling metallic pipes and fittings together, while providing a dependable and secure bond therebetween.

SUMMARY OF THE INVENTION

It is, therefore, an object of the present invention to provide improved and simplified metallic fittings.

It is another object of the present invention to provide copper fittings for bonding to copper tubing which substantially enable control of solder when bonding the copper fittings to the copper tubing.

It is a further object of the present invention to provide copper fittings for bonding to copper tubing that provides a means for evenly disbursing a sufficient amount of solder in the coupling of the fittings and the tubing.

It is yet a further object of the present invention to provide a method for forming copper fittings for bonding to copper tubing that provides evenly distributed amounts of solder when coupling the copper fittings and the copper tubing together.

It is still a further object of the present invention to provide a method for consistently and dependably bonding copper fittings and copper tubing together to form fluid tight systems by the application of heat to snug-fit fittings having solder incorporated therein so as to provide evenly distributed amounts of solder to the joints formed between the coupled elements.

These and other objects and advantage of the present invention are achieved by providing fittings that have a plurality of annular cavities disposed in their inner periphery adjacent at least one open end thereof. Solder is disposed in the annular cavities and substantially fills the cavities. The solder does not extend into the inner periphery of the fittings. The fittings may take any well known configuration, such as an end cap, a T fitting, a 90° or 45° angle, or the like.

The fittings are fabricated by first placing and clamping at least one open end portion of a desired shaped fitting in a hollow of a die means. The hollow has annular depressions that extend perpendicular to the length thereof. A first mandrel sized to form a snug-fit with the internal periphery of the fitting is provided. The first mandrel has a plurality of internal ring forming means, such as a plurality of ball bearings, sized complementary to the annular depressions in the die hollow. The internal ring forming means are located in a first end of the first mandrel. The first mandrel is inserted into a selected open end of the fitting until the internal ring forming means are in substantial alignment with the annular depressions in the hollow. The internal ring forming means are then forced or propelled out of the first mandrel against the inner periphery of the fitting. The internal ring forming means within the first mandrel is then actuated or operated, against the inner periphery of the fitting so that the internal ring forming means complete the formation of a plurality of annular cavities in the inner periphery of the fitting, at the desired locations adjacent the selected open end thereof. The operation of the internal ring forming means in then stopped and the first mandrel is withdrawn from the open end of the fitting, for insertion into a further open end of the same fitting or other fittings.

A second mandrel sized to form an interference fit with the inner periphery of the fitting in which the annular cavities have been formed is provided. The second mandrel is coupled to a bath of molten solder. The second mandrel further has a first end with a plurality of apertures disposed therethrough. This second mandrel is then forced into the open end of the fitting in which the annular cavities have been formed, such that the plurality of apertures therein are substantially aligned with the formed plurality of annular cavities adjacent the open end in the inner periphery thereof. Molten solder is then quickly injected into the annular cavities, through the apertures, to substantially fill the aligned annular cavities with solder. The second mandrel is then withdrawn from the tubing. The interference fit of outer periphery of the second mandrel substantially removes or wipes away any solder protruding from the annular cavities into the inner periphery of the fitting.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a front elevational view of a first embodiment of a fitting of the present invention, having a section of tubing inserted into one open end thereof;

FIG. 2 is a side elevational view of a second embodiment of a fitting of the present invention;

FIG. 4 is a schematic side elevational view showing a second step of the process used to fabricate fittings of the present invention; and FIG. 5 is a further schematic side elevational view showing a third step of the process used to fabricate fittings of the present invention.

DESCRIPTION OF THE PREFERRED EMBODIMENTS

Figure 3:
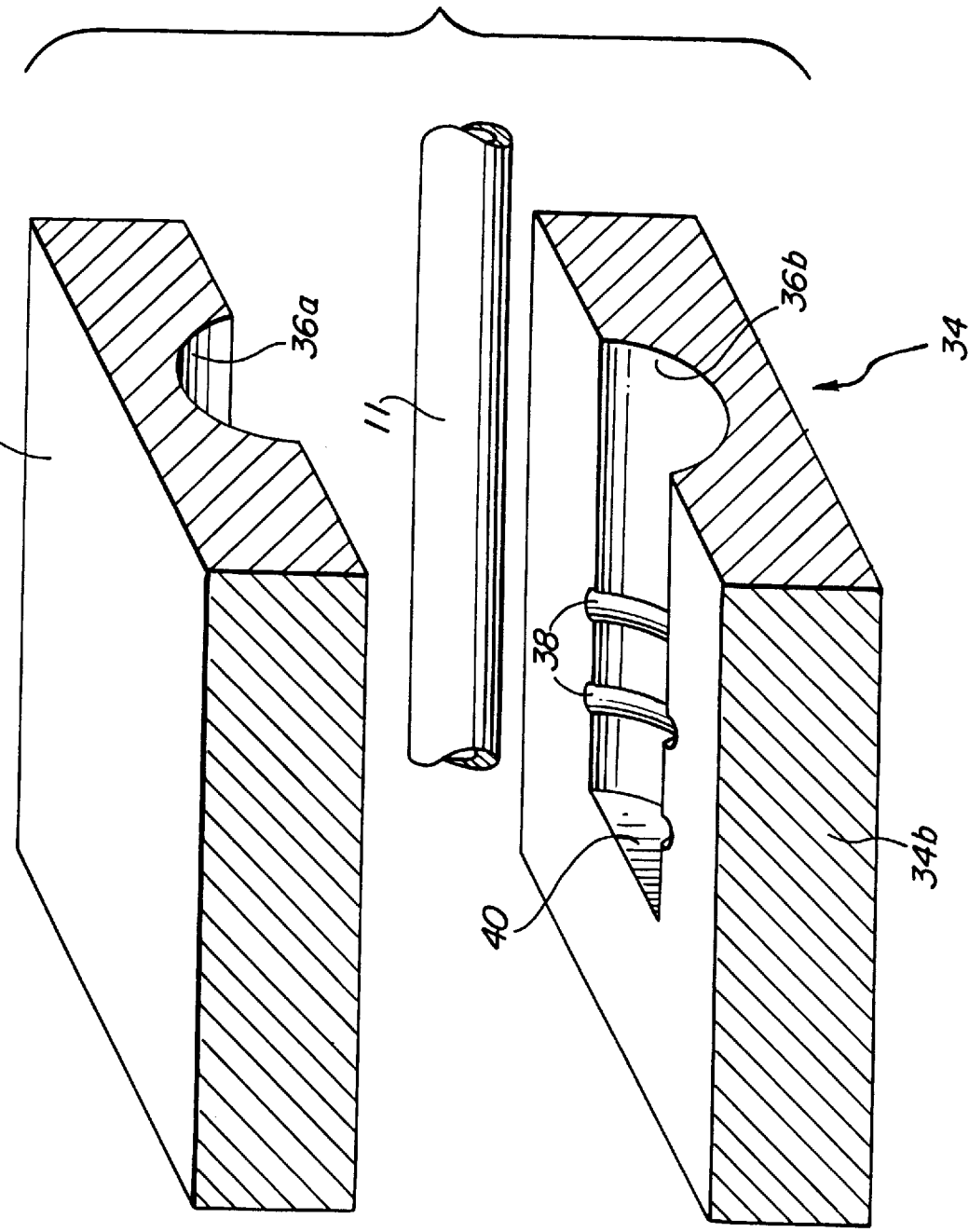
FIG. 3 is a fragmentary, schematic perspective view, showing a portion of a die and a portion of a fitting to be fabricated therein, in accordance with the novel process of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for improved and simplified copper fittings having at least one, but preferably a plurality of annular cavities, disposed in their inner peripheries adjacent at least one open end thereof, a process for fabricating the same, and a method of constructing fluid systems from such formed copper fittings and copper tubing.

Referring now to FIG. 1 of the drawings, there is shown a preferred embodiment of a fitting 10. The fitting 10 is preferably copper, but could be made from any other suitable material for use in fluid systems, such as a plastic or other ductile metal. The fitting 10 is fabricated using one or more portions of copper tubing 11. The fitting is shown in a T-junction configuration 12, but may be fabricated in any well known configuration, such as an end cap, a straight, a 90° angle, a 45° angle fitting, or the like. The fitting 10 may be of any desired size, and has at least one open end, but is shown for purposes of illustration only, and not by way of limitation, as having a first open end 14, a second open end 16, and a third open end 18. Each open end 14, 16, 18 is adapted to receive and hold a portion of metallic pipe 20 therein. This pipe is preferably copper and of a predetermined size to form a fluid system, as is well known to those skilled in the art.

A plurality of internal annular cavities or rings 22 (shown in FIGS. 4 and 5) are located proximal to each of the open ends 14, 16, 18 of the tubing 11, at a predetermined distance therefrom. The cavities 22 are disposed in an inner periphery 24 of the tubing 11 and are formed in such a manner that they cause raised external ring portions 26 to be formed in an outer periphery 28 of the tubing 11.

Dimple or holding means 30 may be formed on the inner periphery 24 of the tubing 11 to abut and hold the copper pipe 20 when inserted in the fitting 10, to prevent the pipe 20 from accidently falling or slipping from the open end of a fitting into which it has been inserted, prior to being bonded thereto. A further indicating or stop means 31, such as an inwardly projecting annular ring or node may be provided to indicate that the pipe 20 has been inserted into the fitting a sufficient distance to enable it to be properly bonded thereto, as described more fully below.

A bonding agent or means 23, such as solder when using copper or other metallic pipes and fittings (see FIG. 5), is disposed in and substantially fills the internal annular cavities 22. The bonding means, however, does not protrude into the inner periphery 24 of the tubing 11.

Referring now to FIG. 2, there shown is a second embodiment of a fitting 10a of the present invention. The fitting 10a has tubing 31 with a small diameter second open end 32. The fitting 10a with the small diameter second end 32 can be used in applications where it is desired to step down to smaller pipe and/or to alter the flow rate of water through a fluid system. The small diameter second open end 32 also includes a pair of annular internal cavities 22a with outwardly protruding ring portions 26a, with the remainder thereof having the same elements designated by the same numerals as FIG. 1.

Referring now to FIG. 3 of the drawings, there shown is a representational or schematic of a first step in the method or procedure, preferably used to fabricate the fittings in accordance with the present invention. This method will be described particularly, to form solder filled cavities 22 in a copper fitting's inner periphery 24. A die 34 means has complementary top 34a and bottom 34b portions. An semi-circular hollow 36a, 36b of any desired shape, but preferably in the shape of a specific fitting to be formed is provided in each portion 34a, 34b of the die 34, in a known manner. As shown herein for reasons of simplicity and not by way of limitation, the die is shown for use in forming a pair of annular cavities at only one open end of a tubing 11. However, it should be understood that this step also applies to the use of more complicated dies for the simultaneous formation of fittings having a plurality of internal annular cavities at a plurality of open ends, such as shown in FIGS. 1 and 2 hereof. The die 34 is provided with complementary, semicircular hollows 36a, 36b each having at least one, but preferably a plurality of depressions 38, such as the pair shown, therein. The depressions 38 may be located proximal to any open or closed side or end of the die, such as a closed back end 40 shown, of each of hollows 36a, 36b. These depressions 38 are substantially perpendicular to the lengths of the hollows.

The hollows 36a, 36b and depressions 38 may have any desired radius, depending on the size of the fitting to be formed, so log as they tightly grip the tubing 11, when it is placed in the die and the die is closed, in a manner well known to those skilled in the art.

Any fitting to be formed, such as the copper tubing 11 illustrated, is placed into the bottom hollow 36b, in alignment with the depressions 38, such as, until the open end to have cavities formed therein, substantially abuts the hollow's back end 40. The die's top portion 34a is brought into contact with the die's bottom portion 34b in any known manner, to firmly and securely grip the tubing 11 in the die.

Referring now to FIGS. 4 and 5 of the drawings, there shown are schematics of further steps of the procedure used to fabricate fittings of the present invention. A first cavity forming means or mandrel 44 is sized to provide a snug-fit with the inner periphery 24 of a fitting, such as the tubing 11 shown. The first mandrel 44 may take the form of a hollow exterior portion 43 having a tapered exterior outer end 45 and a movable inner portion 47, having a tapered internal outer end 46. Each of these tapered ends is shown exaggerated for purposed of clarity in explaining the invention only, it being understood that the tolerances and clearances must be exactly calculated for exact inner annular cavities in the fitting being formed. The mandrel 44 includes an internal annular cavity or ring forming means 48 therein. This annular cavity forming means may take any desired configuration which is adapted to form smooth internal annular cavities within the inner periphery of the tubing 11. In a preferred embodiment of the invention, this annular cavity forming means 48 is a plurality of ball members, such as ball bearings of a predetermined size and hardness, permanently, but movably captured between the tapered end 46 and the exterior portion 43 of the mandrel, so as to be capable of being actuated or propelled therefrom, through a plurality of apertures or openings 49, formed through the exterior portion 43. The ball members 48 are sized complementary to the depressions 38 in the die hollows 36a, 36b, so that when the are actuated or propelled through the apertures 49, as by the application of a hydraulic fluid thereto through the inner portion of the mandrel 44, the ball members will be forced against the inner periphery 24 of the tubing 11 to the position shown in broken line in FIG. 4, as explained more fully below.

The first mandrel 44 is inserted into an open end of the tubing 11, when the tubing 11 is securely clamped and held in the die 34 (not shown in FIGS. 4 and 5). The mandrel 44 is inserted into the tubing 42, until openings 49 of the exterior portion 43 are in substantial alignment with the annular depressions 38. The ball members 48 in the interior portion 43 are then aligned with the apertures 49 and the ball members 48 are actuated, or propelled through the apertures 49 against the tubing's inner periphery 24. The ball members 48 are actuated or propelled out of the mandrel 44 using know means, such as hydraulic pressure means, acting against the interior portion 47, for example. After passing through the openings 49, the ball members 48 are further pressed into the tubing's inner periphery 24 by the inner tapered end 46. The entire mandrel 44 is then rotated, in any desired manner, such as by a motor or the like (not shown), with the ball members 48 remaining in forced contact with the inner periphery 24 of the tubing 11. This rotation continues until complete, smooth inner annular cavities 22 of a predetermined depth to hold a sufficient amount of bonding agent, such as solder, to bond the fitting being made to a pipe, are formed in the inner periphery 24. In the preferred embodiment, the plurality of ball members 48 are diametrically opposed, so that as the mandrel 44 must only be rotated substantially 180°, to form the annular cavities 22. More than one series of rotation may be needed, for example, if large fittings having substantially thick walls are to be formed.

After formation of the cavities 22, the pressure on the ball members is released, to enable the ball members to be biased or fall back through the apertures 49 into the interior of mandrel 44, and the mandrel is withdrawn from the tubing 11.

A second bonding agent filling means or mandrel 50 is coupled to a bath of molten solder (not shown). The second mandrel 50 is sized to provide an interference fit with the tubing 11. The second mandrel 50 also has movable interior and exterior portions with tapered ends 52 and 53. The second mandrel 50 further includes a plurality of apertures 54 disposed through the inner portion, connected to an interior passage means 56. A further plurality of openings 55 are provided in the exterior portion of the mandrel.

The second mandrel 50 is forced into the tubing 42, until the openings 55 are substantially aligned with the annular cavities 22. The apertures 54 of the interior portion are then aligned with the openings 55. The mandrel 50 is inserted in the tubing 42 using known means, such as a hydraulic or pneumatic piston (not shown). Molten solder is disbursed into the annular cavities 22 through the apertures 54 and 55 via the conduit 56 extending through the second mandrel 50 and connecting to the bath of molten solder, in a manner known to those skilled in the art. Solder is disbursed into the cavities 22 such that it substantially fills them. For example, the solder is disbursed into the cavities 22 using air pressure.

When the solder hits the cavities 22 to fill the same, the momentum of any further solder injected out of the apertures 54 will cause the interior portion of the second mandrel to bounce back, therefore, cutting off the flow of solder to the openings 55 and into the cavities 22. The second mandrel 50 is then removed from the tubing 11. Since the outer periphery 58 of the exterior portion of the mandrel has an interference fit with the inner periphery of the tubing 11, as the mandrel 50 is being then withdrawn the periphery 58 of the second mandrel 50 removes or wipes any excess solder protruding into the tubing's inner periphery 24. After removal of the second mandril, the elasticity, or metal memory of copper returns the tubing 11 to its original diameter.

In use, when assembling a fluid system using the fittings of the present invention, a flux material may be applied to the copper pipe 20 and to a fitting's inner periphery. For example, when referring to FIG. 1, with copper pipes 20 inserted into all or any of the desired open ends 14, 16, 18, of the fitting 10, such as open end 16, to snug-fit the pipe 20 to the fitting 10. If holding means 30 and indicating means 31 are provided, the copper pipe 20 is inserted in the fitting 10 until the pipe 20 abuts the indicating means 31 and is held in place by the dimple 30.

Heat is then applied to the desired end of the fitting to melt the solder in the cavities 22, for bonding the pipe 20 to the open end of the fitting 10. The solder provided in the annular cavities 22 circumscribes the pipe 20 and is of sufficient quantity, determined by the exact size of the annular cavities formed, so that when heat is applied to the outer rings 26, the solder within the internal annular cavities flows evenly out of cavities, around the pipe 20, and outwardly toward the open end to form a clean, dependable and reliable bond between the inner periphery 24 of the fitting 10 and the exterior of the pipe 20.

It may be seen, that an entire fluid system may, therefore, be easily and quickly constructed by coupling specifically shaped and sized fittings of the present invention with the desired pipes and then heating the rings 26, 26a, of each open end of a fitting, with the pipes secured therein. The system so formed will have clean bonded joints in the simplest and easiest manner possible.

Thus, there has been described improved and simplified copper fittings having a plurality of annular cavities disposed adjacent its open ends on its inner periphery. The annular cavities are located in specific locations at each end of the fittings so that solder in the annular cavities circumscribes any copper pipe placed in the fitting. When heat is applied to the fittings solder flows evenly out and around the pipes to form in a simple and reliable manner substantial bonds between the fittings and the pipes therein. Solder is not lost in the bonding process due to drippage or lack of flow control.

Those skilled in the art will appreciate that various adaptations and modification of the just-described preferred embodiments can be configured without departing from the scope and spirit of the invention. Therefore, it is to be understood that, within the scope of the appended claims, the invention may be practiced other than as specifically described herein.

What is claimed is:

1. A method of fabricating a copper fitting comprising the steps of:

providing a die having an elongated cylindrical hollow, said hollow having at least one annular depression disposed about a periphery thereof;

placing a portion of copper tubing in said hollow;

providing a first mandrel sized to form a snug fit with said copper tubing, said first mandrel further provided with an annular ring forming means complementary to said at least one annular depression and located in an end of said first mandrel;

inserting said first mandrel into said tubing such that said annular ring forming means is in substantial alignment with said at least one annular depression in said hollow;

actuating said annular ring forming means into contact with an inner periphery of said copper tubing;

rotating said first mandrel within the inner periphery of said copper tubing so that said annular ring forming means is pressed into the inner periphery of said copper tubing to form at least one annular cavity in the inner periphery thereof and withdrawing said first mandrel from said tubing;

providing a second mandrel having an outer periphery sized to form an interference fit with the inner periphery of said copper tubing in which said at least one annular cavity has been formed, said second mandrel coupled to a bath of molten solder and having an end with at least one aperture disposed therethrough;

forcing said second mandrel into said copper tubing in which said at least one annular cavity has been formed, such that said at least one aperture substantially aligns with said at least one annular cavity formed in the inner periphery thereof;

injecting molten solder through said second mandrel into said at least one annular cavity through said aperture to substantially fill said at least one annular cavity with solder; and withdrawing said second mandrel from said copper tubing so that said outer periphery of said second mandrel substantially removes any solder protruding into said inner periphery of said tubing.

2. The method of claim 1, further comprising the steps of:

placing said portion of copper tubing in said hollow such that the outer periphery is securely clamped and held in said hollow; and wherein said first mandrel includes a first portion sized to snuggly fit into said portion of copper tubing, and a second portion movable with respect to said first portion, said second portion containing said annular ring forming means comprised of a pair of diametrically opposed ball members sized complementary to said at least one annular depression in said hollow and movably located in a tapered end of said second portion;

propelling said ball members away from said tapered end of said second portion into contact with said inner periphery of said copper tubing;

rotating said first mandrel within said inner periphery of said copper tubing with said ball members pressed into said inner periphery of said copper tubing to form said at least one annular cavity in said inner periphery.

3. The method of claim 2, further comprising the steps of:

providing said second mandrel with a tapered end and first and second movable portions; and moving the first and second portions of said second mandrel to align said at least one aperture disposed therethrough, with a said at least one annular cavity formed in said copper tubing.

4. A method of fabricating a copper fitting comprising the steps of:

providing a substantially flat, elongated die having an elongated cylindrical hollow, said hollow having at least one annular depression disposed about a periphery thereof;

placing a predetermined size portion of copper tubing having an external surface and an internal diameter in said hollow;

providing a first mandrel sized to form a snug fit with the internal diameter of said tubing, said first mandrel further provided with an annular ring forming means complementary to said annular depression and located in an end of said first mandrel;

inserting said first mandrel into said tubing such that said annular ring forming means is in substantial alignment with said at least one annular depression in said hollow with a portion of said copper tubing held therebetween;

actuating said annular ring forming means into contact with said internal diameter of said copper tubing;

rotating said first mandrel within said internal diameter of said copper tubing, with said annular ring forming means pressed into said internal diameter of said copper tubing, to form at least one annular cavity in the internal diameter of said copper tubing; and withdrawing said first mandrel from said tubing.

5. The method of claim 4, further comprising the steps of:

placing said portion of copper tubing in said hollow such that the outer surface is securely clamped and held in said hollow; and wherein said first mandrel includes a first portion sized to snugly fit into said portion of copper tubing, and a second portion movable with respect to said first portion, and said second portion contains said annular ring forming means which is comprised of a pair of diametrically opposed ball members sized complementary to said at least one annular depression in said hollow and movably located in a tapered end of said second portion;

propelling said ball members away from said tapered end of said second portion into contact with said internal diameter of said copper tubing;

rotating said first mandrel within said internal diameter of said copper tubing with said ball members pressed into said internal diameter of said copper tubing to form said at least one annular cavity in said internal diameter.

6. The method of claim 4, including the further steps of:

providing a second mandrel having an outer periphery sized to form an interference fit with said internal diameter of said copper tubing in which said at least one annular cavity has been formed, fluidly coupling said second mandrel to a bath of molten solder;

providing said second mandrel with an end with at least one aperture disposed therethrough;

forcing said second mandrel into said copper tubing in which said at least one annular cavity has been formed, such that said at least one aperture substantially aligns with said at least one annular cavity formed in said internal diameter of said copper tubing;

injecting molten solder through said second mandrel and through said at least one aperture into said at least one annular cavity, to substantially fill said at least one annular cavity with solder; and withdrawing said second mandrel from said copper tubing so that said outer periphery of said second mandrel substantially removes any solder protruding into said internal diameter of said copper tubing.

7. The method of claim 6, further comprising the steps of:

providing said second mandrel with a tapered end and first and second movable portions; and moving said first and second portions of said second mandrel to align said at least one aperture disposed therethrough, with said at least one annular cavity formed in said copper tubing.

8. The method of claim 6, further comprising the steps of:

placing said portion of copper tubing in said hollow such that said outer surface is securely clamped and held in said hollow; and wherein said first mandrel includes a first portion sized to snugly fit into said portion of copper tubing, and a second portion movable with respect to said first portion, and said second portion contains said annular ring forming means which is comprised of a pair of diametrically opposed ball members sized complementary to said at least one annular cavity in said hollow and movably located in a tapered end of said second portion;

propelling said ball members away from said tapered end of said second portion into contact with said internal diameter of said copper tubing;

rotating said first mandrel within said internal diameter of said copper tubing with said ball members pressed into said internal diameter of said copper tubing to form a plurality of annular cavities in said internal diameter.

9. The method of claim 7, further comprising the steps of:

providing said second mandrel with a tapered end and first and second movable portions; and moving said first and second portions of said second mandrel to align said at least one aperture disposed therethrough, with said at least one annular cavity formed in said copper tubing.

* * * * *